US008105148B2

(12) United States Patent
Halliburton

(10) Patent No.: US 8,105,148 B2
(45) Date of Patent: Jan. 31, 2012

(54) AMUSEMENT GAME USING VERTICAL ROTATING WHEEL

(75) Inventor: Ronald D. Halliburton, Delray Beach, FL (US)

(73) Assignee: Benchmark Entertainment, LC, Hypoluxo, FL (US)

(*) Notice: Subject to any disclaimer, the term of this patent is extended or adjusted under 35 U.S.C. 154(b) by 1096 days.

(21) Appl. No.: 11/987,194

(22) Filed: Nov. 28, 2007

(65) Prior Publication Data

US 2009/0137303 A1 May 28, 2009

(51) Int. Cl.
*G06F 17/00* (2006.01)
*G06F 19/00* (2011.01)

(52) U.S. Cl. ... 463/17; 273/119; 273/120 R; 273/144 R; 273/142 R; 273/143; 463/18; 463/16

(58) Field of Classification Search ..................... 463/17
See application file for complete search history.

(56) References Cited

U.S. PATENT DOCUMENTS

| | | | | |
|---|---|---|---|---|
| 1,502,531 | A * | 7/1924 | Rosenthal | 273/115 |
| 1,996,143 | A * | 4/1935 | Callison | 194/205 |
| 2,616,699 | A * | 11/1952 | Franks | 273/120 R |
| 3,166,323 | A * | 1/1965 | Anderson | 273/119 R |
| 3,679,211 | A * | 7/1972 | Hartley | 273/144 B |
| 3,840,235 | A * | 10/1974 | Breslow | 273/119 A |
| 4,043,406 | A | 8/1977 | Wolf | |
| 4,055,344 | A * | 10/1977 | Soucie | 273/110 |
| 4,061,334 | A | 12/1977 | Kanno | |
| 4,210,331 | A * | 7/1980 | Kulesza et al. | 273/120 R |
| 4,240,536 | A | 12/1980 | Noell | |
| 4,303,248 | A | 12/1981 | Shoemaker | |
| 4,662,636 | A | 5/1987 | Crompton | |
| 4,759,551 | A | 7/1988 | Crompton | |
| 5,071,127 | A | 12/1991 | Bromley | |
| 5,176,380 | A | 1/1993 | Evans | |
| 5,275,402 | A | 1/1994 | Malavazos | |
| 5,292,127 | A | 3/1994 | Kelly | |
| 5,385,347 | A | 1/1995 | Halliburton | |
| 5,622,366 | A | 4/1997 | Inoue | |
| 5,785,594 | A | 7/1998 | Seibert, Jr. et al. | |
| 5,845,903 | A * | 12/1998 | Sloan | 273/144 R |
| 5,967,515 | A | 10/1999 | Halliburton | |
| 6,010,130 | A * | 1/2000 | Schreiber | 273/121 B |
| 6,206,370 | B1 | 3/2001 | Halliburton | |
| 6,270,407 | B1 * | 8/2001 | Dodge | 463/18 |
| 6,419,226 | B2 * | 7/2002 | Krise et al. | 273/121 A |
| 6,902,479 | B1 * | 6/2005 | D'Avanzo | 463/18 |

(Continued)

FOREIGN PATENT DOCUMENTS

| | | |
|---|---|---|
| DE | 1774189 | 2/1972 |

*Primary Examiner* — Paul A. D'Agostino
(74) *Attorney, Agent, or Firm* — Andrew C. Aitken

(57) ABSTRACT

This invention is directed to an amusement device consisting of a vertically oriented hollow wheel that is rotated at a constant rate and that has a series of cavities provided along the inner surface of the outer wheel rim. The wheel has front and rear enclosures that prevent game pieces, such as elastic balls, from falling out of the wheel. A player attempts to time the release of game pieces from a holding area located within the wheel to try to have the pieces come to rest in preselected adjoining cavities. If the pieces are detected within the cavities in a winning orientation, a signal is transmitted to a central processing unit which then activates a ticket dispenser.

6 Claims, 7 Drawing Sheets

U.S. PATENT DOCUMENTS

| | | | | |
|---|---|---|---|---|
| 7,083,168 | B2 * | 8/2006 | Seelig et al. | 273/142 HA |
| 7,749,065 | B1 * | 7/2010 | Englman | 463/17 |
| 2006/0009278 | A1 | 1/2006 | Vancura | |
| 2006/0163806 | A1 * | 7/2006 | Toyoda | 273/142 R |
| 2008/0032761 | A1 * | 2/2008 | Seelig et al. | 463/16 |

* cited by examiner

AMUSEMENT GAME USING VERTICAL ROTATING WHEEL

The present invention relates to a skill-based amusement game and more particularly a skill based game that is implemented in a redemption game. A redemption game is a game wherein a player is awarded tickets for the successful play of a game. The game involves providing a plurality of balls to a player who can control the timing of the release inside a vertically oriented rotating wheel. The rotating wheel has a plurality of cavities or pockets provided around the entire inside rim. The position of the balls in the pockets of the rim are located by passing the balls past a detector which includes a light source and photo-detector. If a ball is located within a pocket or cavity in the wheel, light will not pass from the light source to the detector and impinge on the detector at predetermined times. The absence of a signal at such times reflects that a ball was positioned in the cavity or pocket. A detector also detects a home position on the wheel. All of the signals from the detectors are transmitted to a central processing unit which correlates the positions of balls with the home position and the location of those balls that are resting in the cavities at predetermined winning locations.

The object of the game is to time the activation of a ball release so that a plurality of balls will fall from a ball guide to the periphery of the vertically oriented rotating wheel and so they come to rest in player selected target locations. The ball release is activated by a solenoid. A plurality of high energy balls are dropped onto the rotating wheel and the balls will bounce and roll until they are trapped in the depressions or cavities provided at angular positions on the rim of the wheel. If the balls come to rest in the winning target locations, an award is distributed to the player. The winning target locations on the wheel are associated with a symbol, number and/or color.

In a preferred embodiment the object of the game is to have five balls come to rest in pre-selected winning target positions that are adjacent to one another. If the player successfully times his or her drop so that the result is having five balls in a row in the designated a bonus score is provided to the player. In addition, any ball that comes to rest in one of the pre-selected winning target cavities is awarded a score.

In the preferred embodiment of the game, the score of a player is correlated with an award of redeemable tickets that are then distributed to a player by a ticket distributor. If no player wins a game, a bonus award will continue to increase until a player successfully plays the game so that the five balls come to rest in five adjacent pre-selected cavities.

BACKGROUND OF THE INVENTION

There is persistent demand for new games in both gaming establishments and general amusement centers such as arcades or family fun centers. It is generally accepted that customers are more likely to repeat visits to game centers if the game attractions provided by the operator are new and different. New games may also generate publicity resulting in increased traffic and increased play at such locations. In general, games that are popular are those having a game concept that is quickly and easily understood by a prospective player. In addition, the possibility for a large bonus or award adds to the popularity of games. The more popular a game, the more it is played and accordingly it may generate more revenue for the game operator.

Over the years there have been many games that incorporate a rotating wheel into the game concept. The motion of the wheel servers as an attraction and the wheel provides for a manner in which to provide a number of targets that a player can exercise his or her skill to successfully execute the targets.

SUMMARY OF THE INVENTION

This present invention relates to a coin operated amusement device wherein, upon activation of the device, a player is provided with a predetermined number of balls to set into play. The balls are preferably made of an elastic material, commonly referred to as "super balls," that enable the balls to bounce off surfaces of the game. The object of the game is to time the activation of a solenoid that releases all of the balls simultaneously into the rotating wheel. The balls will then free fall from an upper guide toward the lower surface of a rotating wheel and bounce around in the wheel until they eventually come to rest in a cavity that is slightly larger than the dimensions of the balls. If the player successfully times the release drop, the balls may fall and cluster in such a manner wherein all of the balls, occupy a location next to another ball (except the first and last ball in the sequence). The wheel rotates at a constant speed. Apertures are provided through each of the cavities transverse to the orientation of the wheel which allow light to pass between a light source and a photodetector. If no ball is in the cavity, the photodetector will detect the presence of light, proving a signal that can be interpreted by the CPU that no ball is present. If a ball is present in the cavity, the absence of the signal at designated times is be interpreted by the CPU as reflecting that a ball is retained in the cavity. Using a home position on the wheel, the CPU can correlate the location of each of the balls with the designated winning target positions. If five balls are clustered together, adjacent to one another, the CPU will grant a bonus award according to pre-selected award criteria.

As the game is played, a player attempts to time the release of the balls so that they will cluster together and bounce off one another and eventually settle into the cavities located on the periphery of the wheel. The object of the game is to cause the balls to come to rest next to one another in five pre-designated target cavities. The balls will bounce around on the rotating wheel until their energy dissipates and eventually fall into one of the cavities on the rotating wheel. In a preferred embodiment, an award is granted to a player for each ball that is retained in one of the pre-designated target cavities.

In a first embodiment of the invention five balls are released and the object is to get all five balls to occupy adjacent target cavities. In an alternative embodiment, six balls are dropped from the holding area and the object is to have all six balls fall into adjacent pre-designated target cavities. After the release the balls will then bounce and roll until each ball is captured within one of the cavities. As discussed above, a sensor detects the location of the balls in the depressions or cavities and sends a signal to a controller reflecting the particular location which the balls have come to rest.

The controller then correlates the location of the balls with the pre-designated winning target locations that may also be indicated to the player by color or a symbol. If the balls are correlated with the wining target locations, a predetermined bonus award is granted to the player. After the balls come to rest in a cavity, the balls continue to rotate around the wheel and are kept in place by a guide member. When the balls reach an angular position that is sufficiently inverted, the balls will drop out of the cavities into a collection area.

In alternative contemplated embodiments the cavities can be provided with other graphical designations including numbers, colors, suits (such as those used on playing cards) and other symbols. In such alternative contemplated embodiments the award can be based upon the successful play depending on the location of the balls in the pre-designated cavities. The play of the game may be altered by increasing or decreasing the number of balls, the number of cavities, the scoring criteria and the speed that the wheel turns. In yet a further contemplated alternative embodiment, the player can select the target cavities by entering its designated symbol or number into the CPU and the player is provided an award if the balls come to rest in the pre-selected cavities.

DETAILED DESCRIPTION OF PREFERRED EMBODIMENTS

Figure 1:
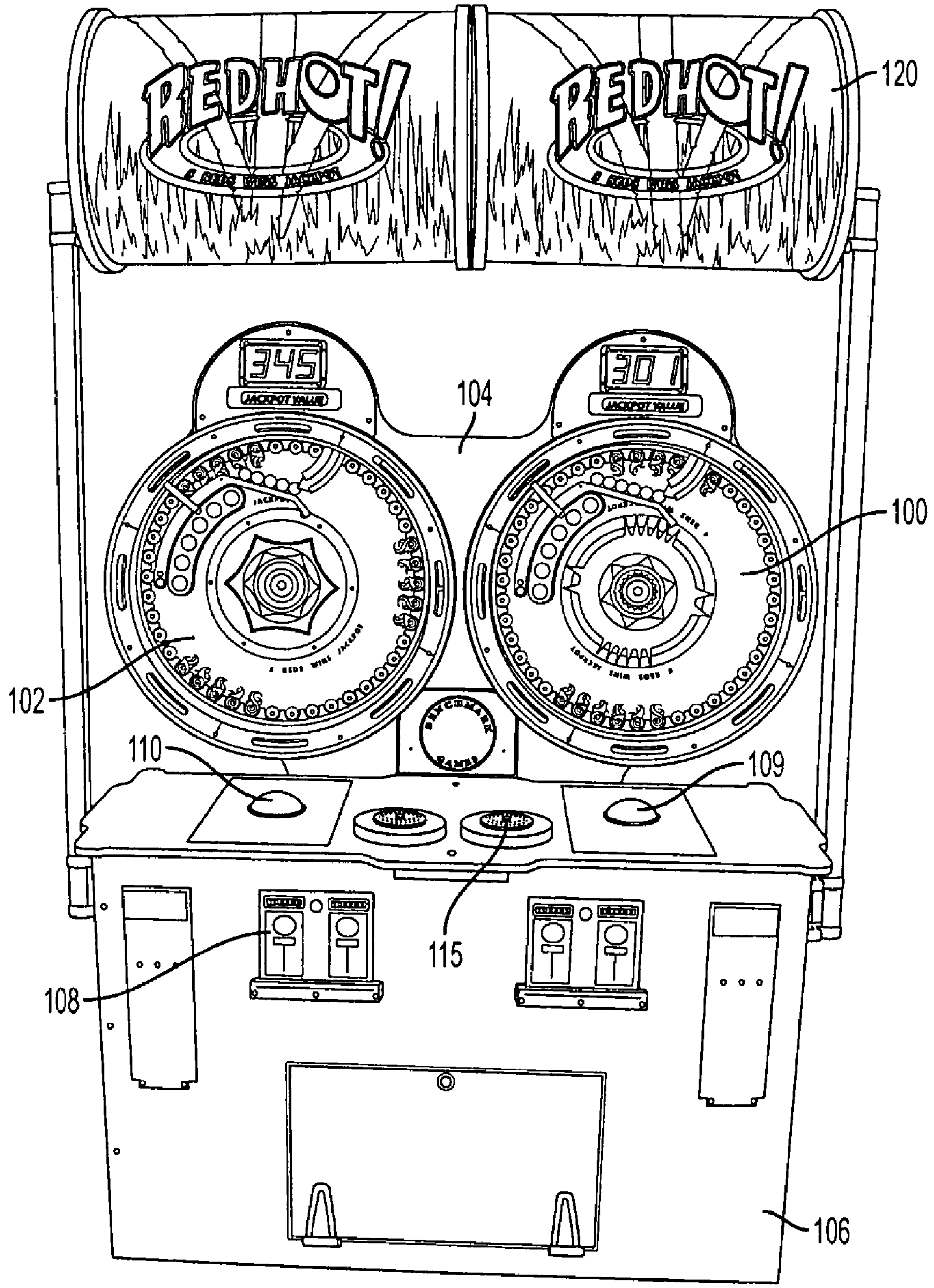
FIG. 1 is a front view of a first embodiment of the invention.

Now referring to FIG. 1, a preferred embodiment of the invention includes rotating wheel 100 and rotating wheel 102 which are oriented in a vertical position. The wheels are driven by a motors (not shown), and enclosed by a transparent case 102. The wheels are mounted on rear support member 104 which extends from cabinet 106. On the front surface of cabinet 106 there is provided a coin or token acceptor 108 that will detect genuine coins or tokens and send a signal to a central proceeding unit reflecting a credit has been detected. On the top surface of cabinet 106 are activation buttons 109 and 110 that correspond to each respective wheel and control the ball release solenoid. Upon the detection of a genuine coin, credit switch 115 is activated by the game controller or central processor. Activation of the credit switch allows the activation buttons 109 and 110 to be operable. On the lateral sides of cabinet 106 are support members 115 and 116. Support members 115 and 116 support a sign 120 that advertises and identifies the game.

Figure 2:
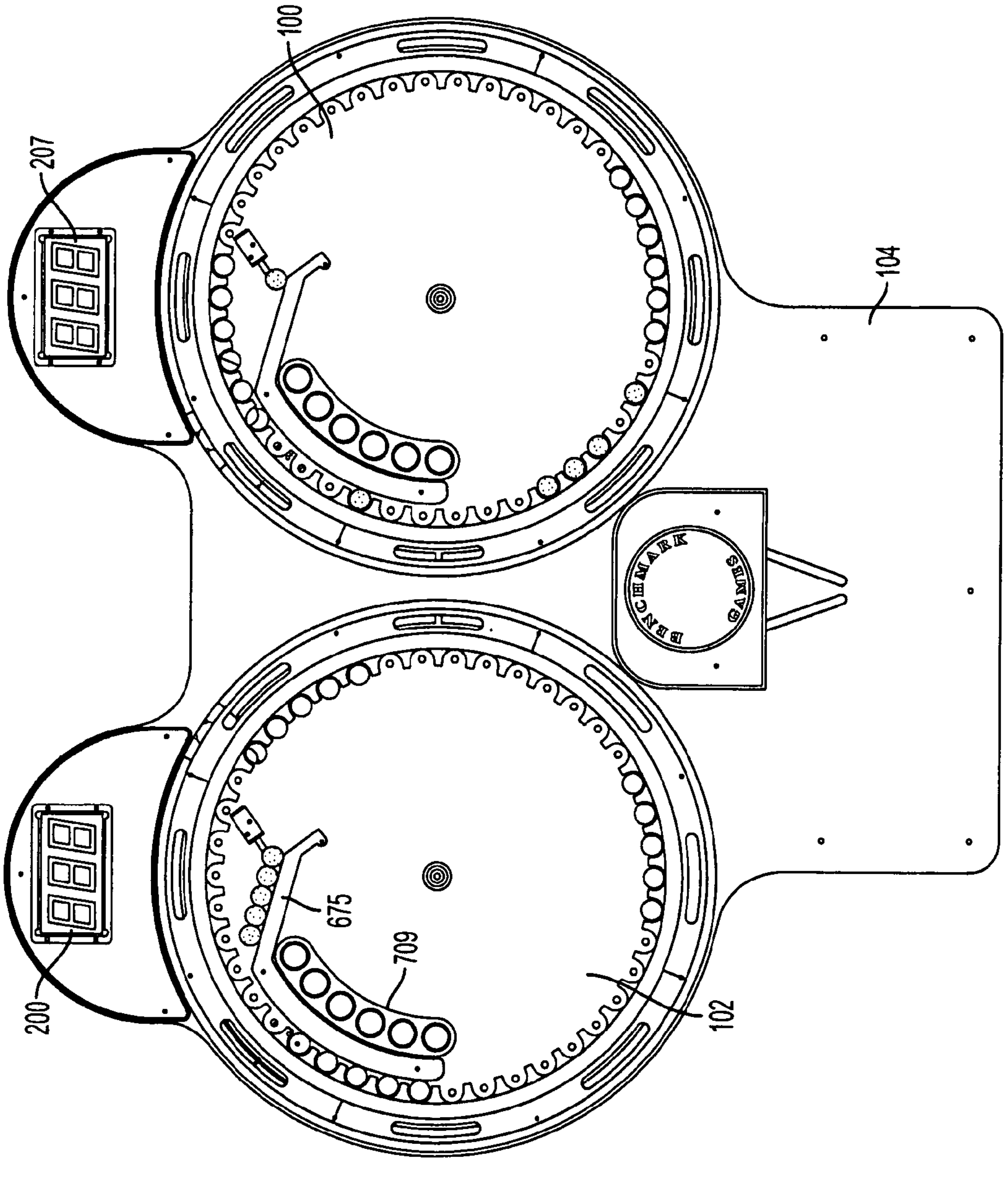
FIG. 2 is a front plan view of the wheels attached to the support member 104 along with bonus score displays 200 and 207.
Figure 3:
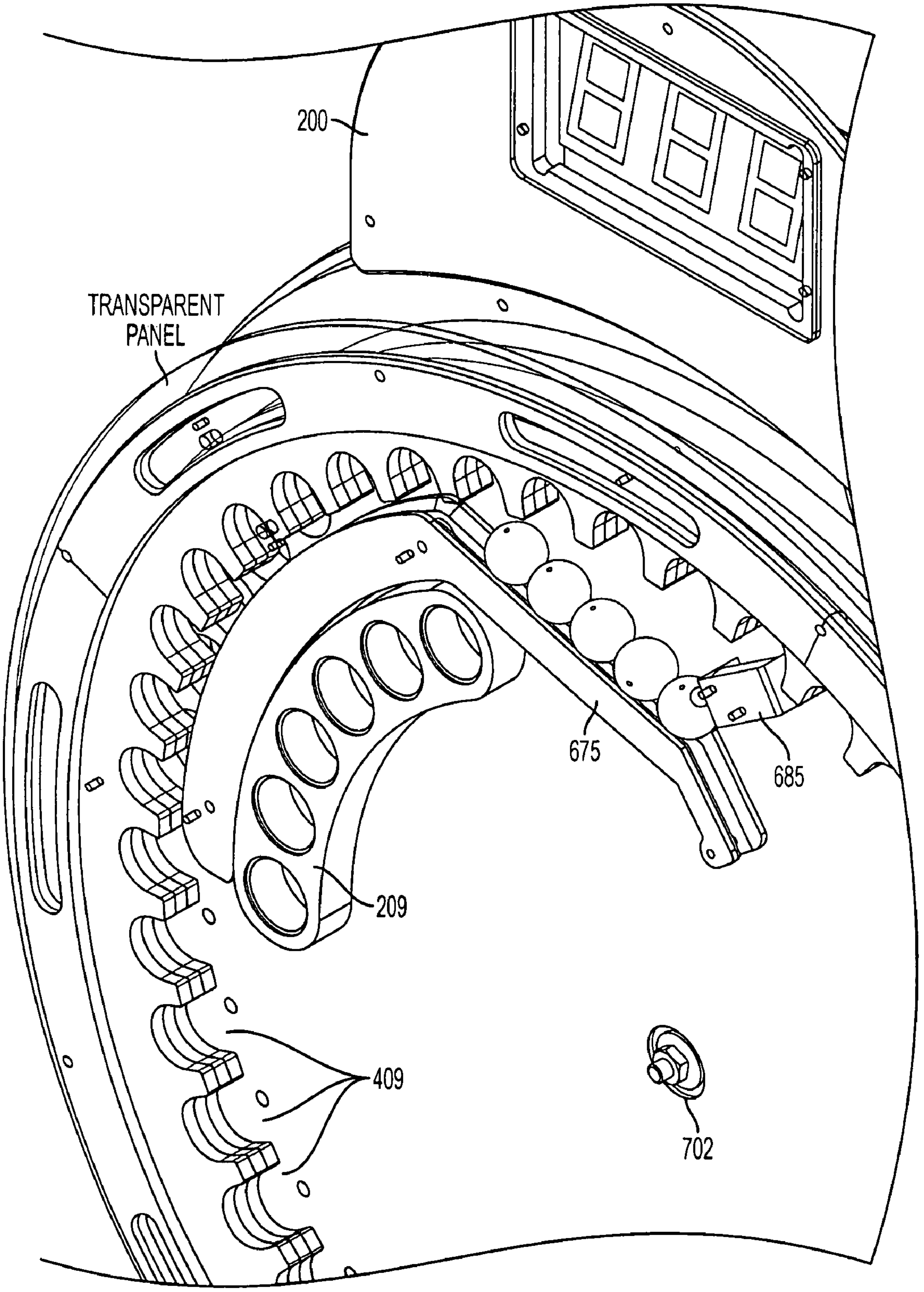
FIG. 3 is a close-up view of the ball guide and release mechanism.
Figure 5:
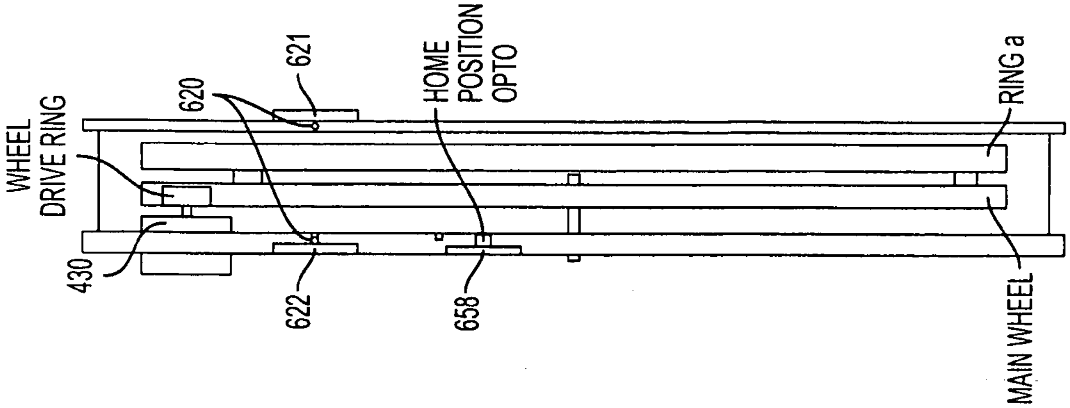
FIG. 5 is side plan view of one of the wheels.

Now referring to FIG. 2, a side view of the game device reveals the lateral sides of a rim 200 on which printed matter is provided and which surrounds the wheel. As seen in FIG. 3, the wheels are attached to support member 104 to allow for rotation. The wheel is rotated at a constant rate. At the top bonus displays 200 and 207 provide information to player relating to the size of the award. The bonus may be incrementally increased based upon the number of times the game is played without a player successfully hitting a jackpot. As described above, in the preferred embodiment a jackpot is achieved when all of the balls fall into a series of pre-designated cavities located adjacent to one another.

Figure 4:
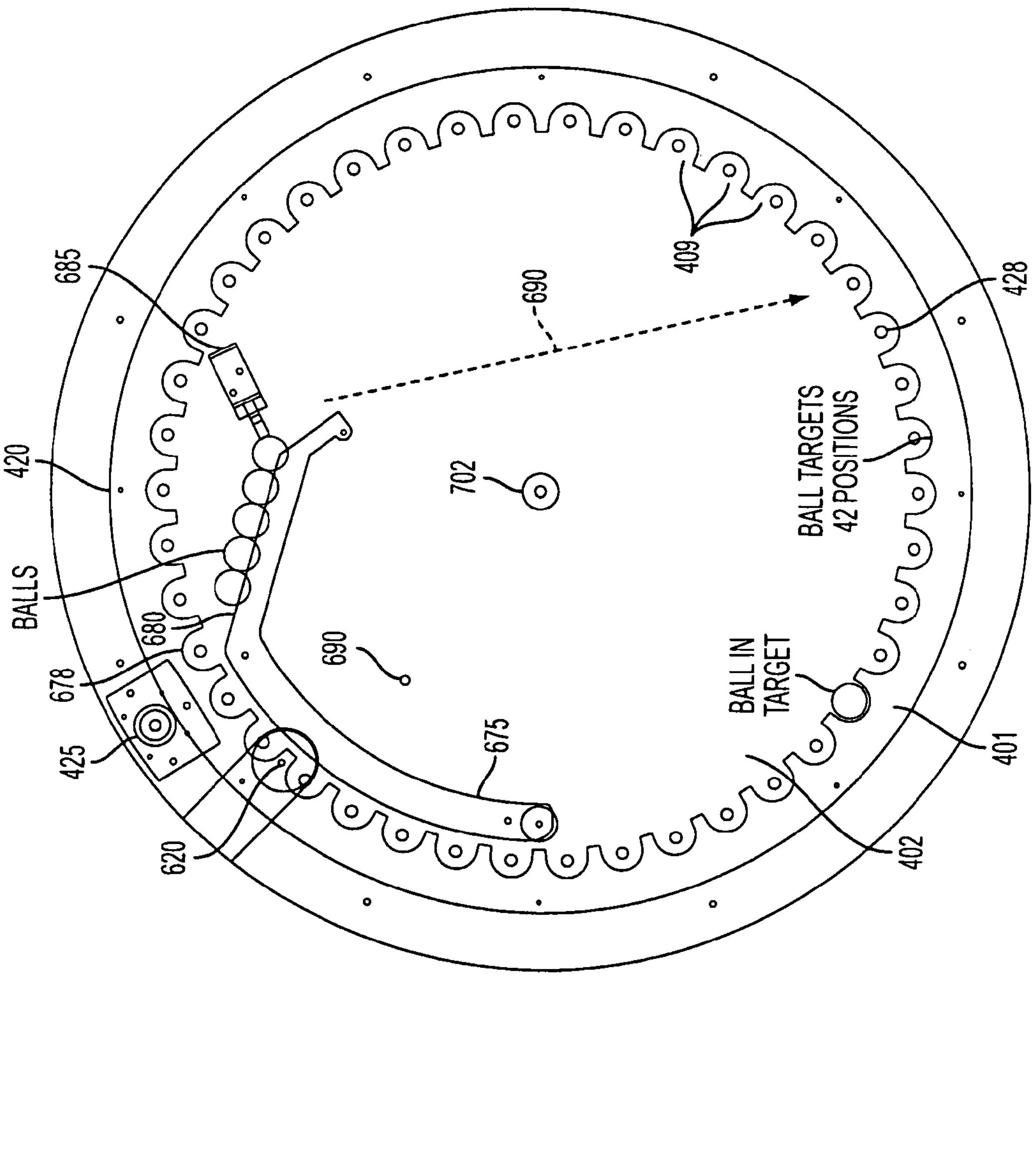
FIG. 4 is a front plan view of one of the wheels illustrating the ball drop path.

Now referring to FIG. 4, the rotating portion of the wheel is comprised of outer annular ring 401 to which is attached a main planar disc section 403. In the center of the wheel a main wheel bearing is provided that receives an axel which connects the wheel to the support member 104 and allows for rotation. The wheel is driven by frictional engagement with drive ring 425 which contacts the outer surface 420 of annular ring 404. Drive ring 425 is powered by a stepper motor 430 that drives the wheel at a constant rate of approximately 10 RPM. On the inner surface of annular ring 404 are a series of adjacent pockets or cavities 409 that are sized to receive the balls that are used to play the game. The cavities are provided around the entire wheel at angular positions. Each cavity or pocket is provided a through hole, such as ball check opto hole 428, that transverses the main annular disc section 403 of the wheel. As the wheel turns each of the ball check opto holes pass by the ball check opto device 620 which includes an infra red light source 621 and a photodetector 622. If no ball is retained in the cavity, the light from the infra red light source 621 will travel from the source, through the ball check opto hole and impinge on photodetector 622. If a ball is trapped in the cavity, the light is blocked and no signal is generated by the photodetector. A transparent panel is provided on the front of the wheel to prevent the balls from exiting the wheel from the front side. The ball guide 675, the solenoid 685, and the light source 621 for the ball check opto hole 428 are mounted on the transparent panel. The rear of the wheel is a solid disk.

Also provided is a wheel home position optical sensor 650. A pin or extension 690 is provided on the rear of the wheel which, upon each rotation, will travel between a light source and photodetector which makes up the home position optical sensor 650. At each instance pin 690 travels through the light beam, the signal from the photodetector to the CPU is interrupted. The CPU interprets this interruption of signal as the home position of the wheel.

Figure 6:
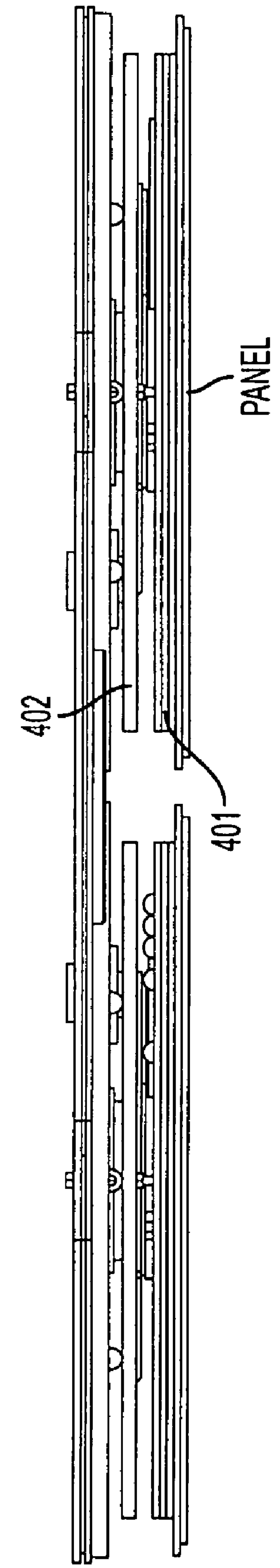
FIG. 6 is a top view of the wheels.
Figure 7:
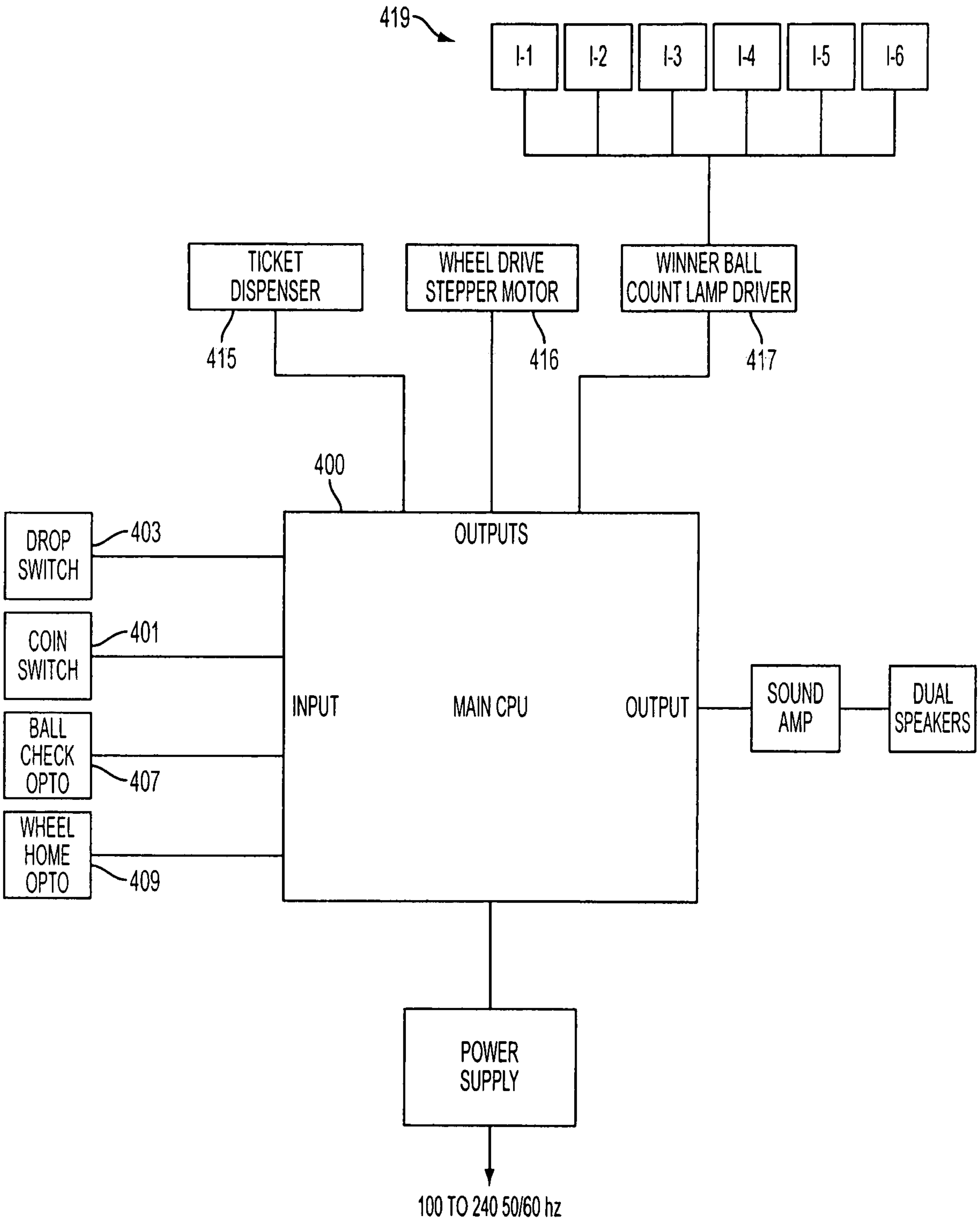
FIG. 7 is a schematic drawing of the input and output to the controller or main central processing unit.
Figure 8:
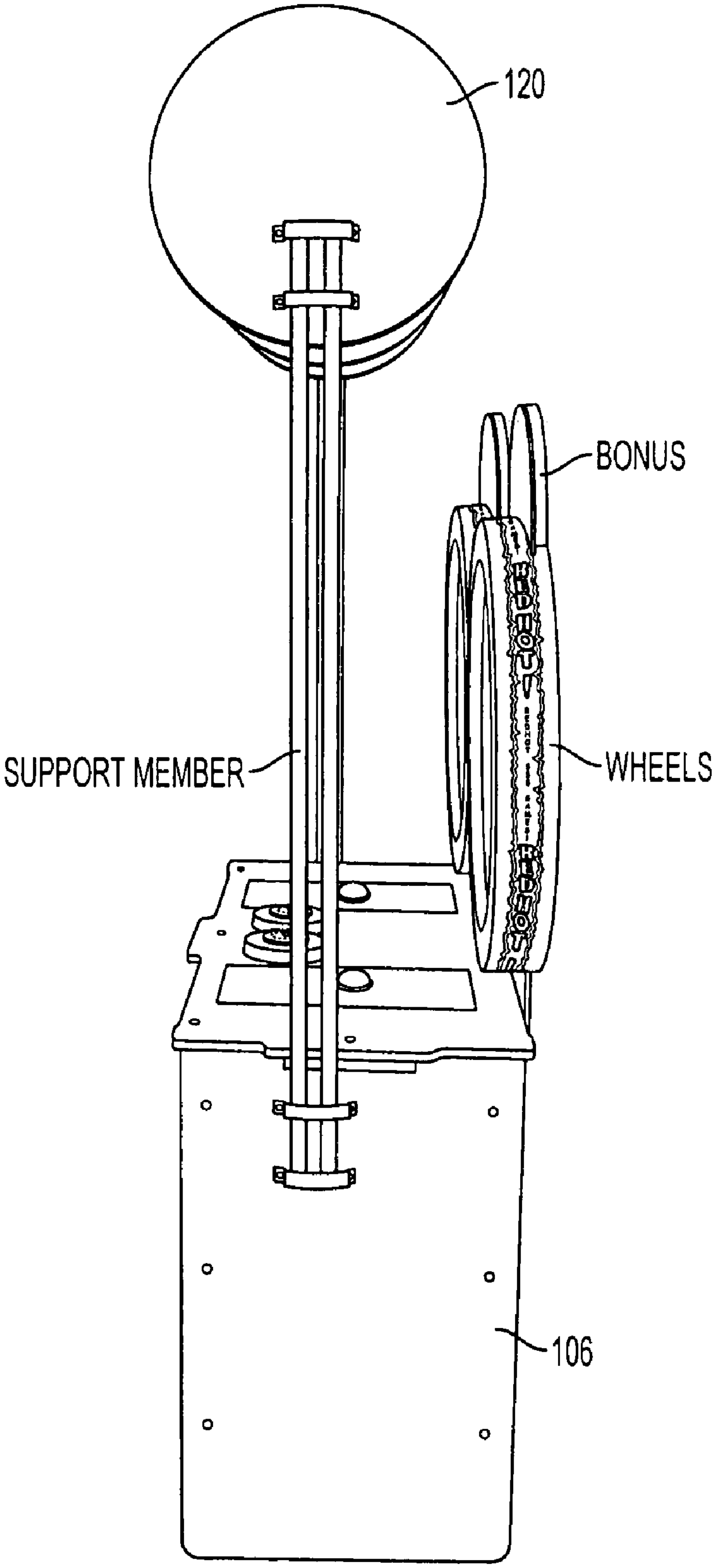
FIG. 8 is a side view of the game.

Also shown in FIG. 6 is the ball guide or reload ramp 675. If a ball is contained within one of the cavities, as it reaches the ball reload ramp, the cavity begins to invert and the ball will begin to roll from its seated position in the bottom of the cavity toward the bottom of the wheel. The balls are prevented from falling out of the cavity by the guide 675. When the ball reaches an angular position in the area identified by reference numeral 678, the guide veers off away from the edge of the wheel and at a downward angle. Balls located in the cavities will roll out and down surface 680 until they reach ball drop solenoid 680 which retains the balls in position until the solenoid is activated. Upon activation of solenoid 680 the balls are allowed to be released and roll down surface 680 into the wheel along a ball drop path 690.

The wheel is mounted to the support member 104 at the center. A pin that extends from support member 1045 is received in main wheel bearing 702.

Now referring to FIG. 4 a main CPU 400 or controller serves as an operator. Inputs to CPU 400 include signals from the coin switch 401 which provides a credit to the player and consequently activates drop switch 403. The drop switch 403 controls the ball drop solenoid 685. A ball check opto 407 remains in a stationary position and provides signals to the CPU 400 which reflect the presence of a ball in the cavities as they pass between the light emitter and photodetector. The signal to the CPU is generated by the photodetector. A wheel home opto device 409 is provided on the support member 104 and also generates a signal that is transmitted to CPU 400 to allow the CPU to correlate the location of the cavity with respect to the time in which a ball check opto signal is received. When the home position pin is sensed, a wheel position counter function is reset to zero indicating the starting position of the wheel. The wheel position counter is incremented when one of two conditions exists (1) a through hole is detected, or (2) a timer (based upon the wheel speed and the relative space between adjacent ball cavity locations) has expired, indicating that sufficient time since the last through hole was detected has passed and the current wheel location therefore contains a ball blocking the ball check opto-sensor. When either of the above conditions exists the timer is reset in anticipation of the next ball position, and the wheel position count is incremented. If the thru hole was blocked, the location of the blocked hole is logged so that the result of the game play may be determined. In addition, since the wheel rotates at a constant speed, the location of each ball may be precisely determined. Output from CPU 400 includes instructions to the ticket dispenser 415 to dispense tickets in response to an award that is calculated by CPU 400. The wheel drive stepper motor 416 is also activated and controlled by the CPU. The CPU 400 also provides a signal to the winner ball count lamp driver 417 which controls the display 419 and which displays the bonus to the player at a particular time.

In addition, the CPU controls a sound amp which powers speakers and a sound track which reflects conditions of the game. For example, if a win is detected the CPU may activate a sound effect consistent with the win. The CPU may also activate sounds in an attract mode.

While the wheel is enclosed by a transparent panel, other types of enclosures would also work in the invention. For example, a series of spokes, screens or other impediments that prevent the balls from falling out of the lateral sides of the wheel would be sufficient. As recited herein, it is apparent that after a ball or game piece comes to rest in one of the cavities it revolves up and will then come into contact with the ball guide. Continued rotation of the wheel causes the balls to be released onto surface where the balls are retained until the next play of the game is implemented.

It will be clear to one skilled in the art that the embodiments described above can be altered in many ways without departing from the scope of the invention. Accordingly, the scope of the invention should be determined by the following claims and their legal equivalents.

I claim:

1. An amusement device comprising a vertically mounted wheel having a plurality of cavities provided on the periphery of said wheel along an inner rim, front and rear enclosures to prevent game pieces from falling out of said wheel, a motor to rotate said wheel at a substantially constant rate, a releaser to sequentially release a plurality of game pieces into the wheel so that said pieces immediately fall from said releaser one after another and then free fall along a substantially vertical path from said releaser toward said inner rim and said releaser therefore may cause a plurality of pieces to be contained in the bottom half of said wheel at the same time after a release of said game pieces from said releaser, a game piece detector positioned at a location wherein said cavities will pass by said detector and wherein said detector generates a signal in response to the absence of a ball in said cavities and transmits said signal to a central controller, a home position detector to detect the position of the wheel, a game piece guide wherein when said pieces are oriented at an angular position sufficient to allow release from said cavities, said guide will temporarily retain said pieces and then allow the release of said pieces to a retention area, and wherein said central controller, uses said signals from said game piece detector and said home position detector to determine the positions of said plurality of game pieces that have been released into said wheel and seated in said cavities and to provide a signal to a dispenser which may dispense an award in response to the detection of said game pieces in said predetermined cavities, wherein a player may attempt to time the release of said game pieces so that they come to rest in selected adjacent cavities.

2. The amusement device as recited in claim 1 wherein said game piece is comprised of an elastic polymer and will therefore bounce when it is released within said wheel.

3. The amusement device as recited in claim 2, wherein said games pieces comprise balls.

4. The amusement device as recited in claim 1 wherein said game piece is a ball.

5. The amusement device as recited in claim 1 wherein a plurality of said adjacent cavities apertures are identified as pre-designated winning locations.

6. The device recited in claim 1 further comprising a ticket dispenser, wherein said after said controller determines the location of balls at the predesignated winning locations said controller said ticket dispenser and said dispenser dispenses tickets.

* * * * *